United States Patent [19]

Jessel

[11] Patent Number: 4,541,383

[45] Date of Patent: Sep. 17, 1985

[54] METHOD AND APPARATUS FOR MINIMUM KNOCK OPERATION OF AN INTERNAL COMBUSTION ENGINE ON LOW KNOCK-RATED FUEL

[75] Inventor: Alfred J. Jessel, San Rafael, Calif.

[73] Assignee: Chevron Research Company, San Francisco, Calif.

[21] Appl. No.: 234,810

[22] Filed: Feb. 17, 1981

[51] Int. Cl.[4] .............................................. F02D 19/12
[52] U.S. Cl. .................................. 123/435; 123/25 R
[58] Field of Search ..................... 123/435, 425, 25 R, 123/25 A

[56] References Cited

U.S. PATENT DOCUMENTS

| | | | |
|---|---|---|---|
| 2,517,688 | 8/1950 | Lee, II | 123/425 |
| 4,191,134 | 3/1980 | Goodman . | |
| 4,236,491 | 12/1980 | Hattori et al. | 123/435 |
| 4,261,315 | 4/1981 | Geiger et al. | 123/435 |

FOREIGN PATENT DOCUMENTS

| | | | |
|---|---|---|---|
| 55-5467 | 1/1980 | Japan | 123/425 |
| 528350 | 10/1940 | United Kingdom . | |
| 708711 | 2/1949 | United Kingdom . | |
| 732263 | 6/1955 | United Kingdom . | |
| 2054037 | 2/1981 | United Kingdom . | |

*Primary Examiner*—Parshotam S. Lall
*Attorney, Agent, or Firm*—Burns, Doane, Swecker & Mathis

[57] ABSTRACT

The invention relates to method of, and apparatus for, operating an internal combustion engine on low knock-rated fuels as the primary fuel system in which engine knock is anticipated and suppressed by simultaneously detecting actual engine load conditions that may induce such knock and knock condition that actually are occurring in at least one combustion chamber of the engine. In response to such simultaneous conditions, a small but effective amount of anti-knock fluid is supplied to the engine combustion chambers in an amount and for a time sufficient only to suppress knock to a satisfactory level. Such a system permits the use of more economic fuels, such as gasoline, having a substantially lower knock rating than those normally used in automotive equipment and only small but sufficient anti-knock fluid is added solely when the engine is knocking. Such conditions occur over approximately 5-10 percent of road conditions and can readily be supplied by a 1-2 quart container of anti-knock fluid, such as higher knock-rated gasolines, alcohol or the like for each filling of the fuel tank with 10-20 gallons of less expensive low knock-rated gasoline to improve both economic and energy efficiency.

5 Claims, 3 Drawing Figures

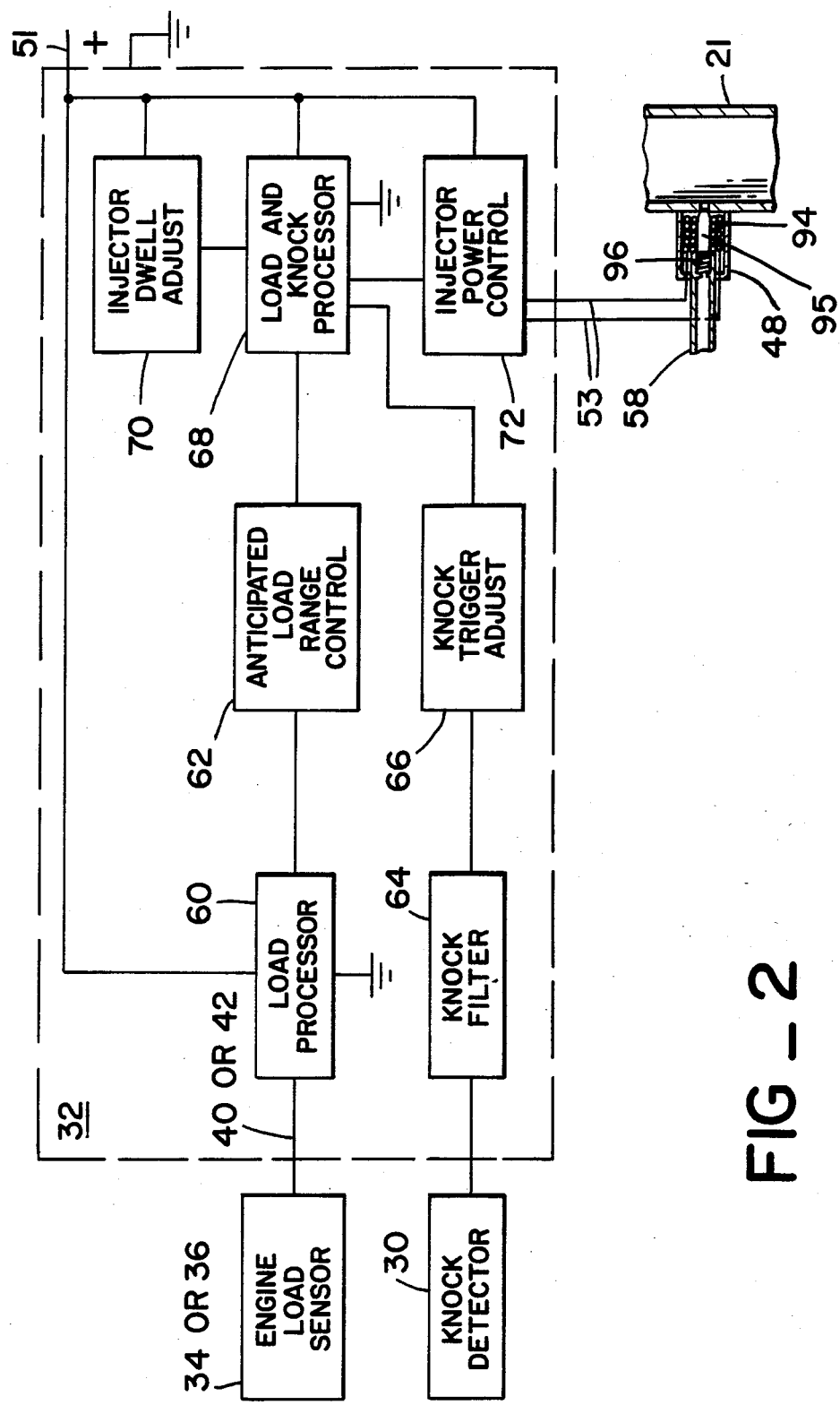
FIG_2

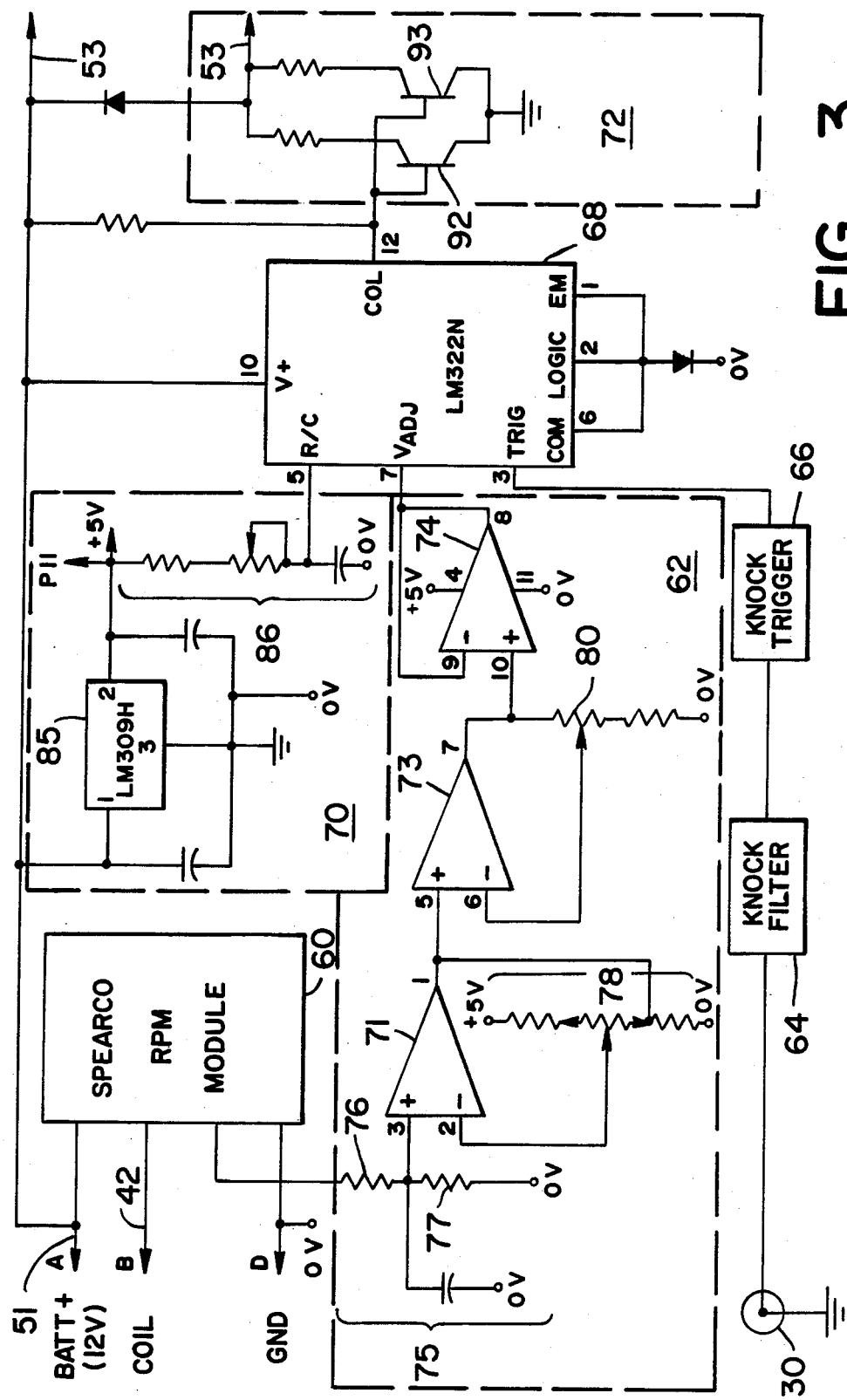
FIG_3

METHOD AND APPARATUS FOR MINIMUM KNOCK OPERATION OF AN INTERNAL COMBUSTION ENGINE ON LOW KNOCK-RATED FUEL

FIELD OF INVENTION

This invention relates to minimum knock operation of an internal combustion engine on a low knock-rated fuel. More particularly, it relates to operating such engines by injecting small, but effective, quantities of anti-knock improving fluid into the engine air supply system in response both to detected knock and engine load conditions. When knock is detected, such small quantities of anti-knock improvement fluid are injected at rates and for time periods dependent upon the engine load condition, as measured by a quantity representative of mass air flow to the engine. Mass air flow is well approximated by engine speed (revolution per minute, RPM) and manifold pressure, but it may also be measured directly.

BACKGROUND OF THE INVENTION

It has long been the practice in automobile, and other automotive equipment, engines to control knock (premature or erratic ignition of a fuel charge in a combustion chamber) by using properly rated anti-knock fuels such as those containing tetraethyl lead or other so-called "knock improvers." Alternatively (or additionally), spark ignition engines have long controlled advance or retard of spark in response to intake manifold pressure to control or suppress potential knocking. In such systems, a rise in intake manifold pressure causes the spark to retard automatically. In general, maximum knock occurs only during a small percent of time that the engine is operating, for example, when climate (heat or humidity) or driving conditions, (grade or acceleration), apply a heavy load to the engine. Accordingly, highly treated or refined, (and hence expensive) fuels to satisfy normal, knock-free operation of the engine, are not necessary over most normal operating conditions. Additionally, usual spark retardation systems are generally dependent on high manifold pressure, which may or may not be associated with potential knocking conditions for the engine. In general, spark retardation robs the engine of power and can result in excess consumption of fuel.

It has been proposed, but never adopted commercially on a large scale, to use two separate sources of fuel to provide knock-free operation of an internal combustion engine. It has also been proposed to use a knock sensor or detector to switch fuel supply from a normally low knock-rated fuel to a higher knock-rated fuel. A primary difficulty with such a system is that on presently existing automobiles, retrofitting of another fuel tank is difficult because of limited space. Also, on new vehicles it would be expensive. Further, in normal operation, the operator would need to find a proper balance between the amount of low knock-rated fuel and high knock-rated fuel to use in such a system.

Alternatively, systems have been disclosed which employ a knock sensor, such as a magnetostrictive device of the type disclosed in Pat. No. 2,445,318, located on one of the combustion chambers of the internal combustion engine, to control automatically spark retardation. The retard command may be proportional to the intensity of the knock present in the engine, and in response thereto ignition pulses are delayed either mechanically or electrically from the distributor to each spark plug. This requires use of a spark distributor able to accept such a delay. Upon reduction in detected knock, a controller restores the distributor spark to its normally advanced position. A description of the latter system is given in an article entitled, "Energy Conservation With Increased Compression Ratio and Electronic Knock Control" by James H. Currie, David S. Grossman, and James J. Gumbelton, published by the Society of Automotive Engineers, Inc., Paper No. 790173. Description of a system for using two fuel systems under the control of a knock sensor is disclosed in a paper published by A. T. Colwell and Thompson Vitameter Corporation, dated Nov. 11, 1947, entitled, "A Program for Anti-Detonant Injection as Applied to Petroleum and Automotive Industries".

McNally, Pat. No. 2,958,317 discloses an anti-detonant system for internal combustion engines in which a knock detector is used for controlling introduction of anti-knock additive either directly into the liquid fuel line or as an aerosol spray into the fuel-air system of the intake manifold. The amount of anti-knock additive is introduced as pulses "shots" of given quantity or so long as knocking is detected. The amount of anti-knock additive introduced may be controlled in response to the extent of knock detected. However, there is no system for modulating or regulating the amount of anti-knock additive in relation to actual engine load condition causing engine knock. I have found that when constant volume pulses are added over the entire engine speed range, say from 600 to 4,000 RPM, the amount of such anti-knock additive is either excessive or inadequate. Where excessive, a small supply, say a quart or two, of such additive to 15 gallons of regular low knock-rated fluid may be quickly exhausted. If inadequate, knock will persist even when pulses of anti-knock fluid are being added to the engine fuel supply. Accordingly, the consumption of anti-knock additive is relatively high and generally unsatisfactory for any detected knock in the engine, and in particular, where knock is only sporadic or intermittent.

Whitty et al, Pat. No. 2,403,774, shows a system for introducing water as an anti-knock suppressant in response to knock or detonation in the engine. It likewise does not show any system for controlling the amount or duration of the anti-knock suppressant apart from detected knock itself.

Van Dijck et al, Pat. No. 2,220,558, discloses a knock suppressing system, which in response to knock alone, modifies the fuel-air ratio, or anti-knock additive supplied to the fuel-air mixture, or retards the spark ignition temporarily.

Other methods have been disclosed for adding anti-knock fluids to the intake system for an internal combustion engine based upon measurement of other conditions. For example, Von Brimer, Pat. No. 3,530,842, introduces anti-knock fluid in accordance with the rate of exhaust gas recirculation to reduce any tendency of an engine to knock, but without actual measurement of knock in the engine. Spears, Pat. No. 4,096,829, injects an anti-knock suppressing fluid, such as water, in response to engine spark ignition rate, representative of engine speed.

Alquist Pat. No. 3,120,218, discloses a system for varying the fuel-air ratio and addition of knock suppressing fuel, such as liquefied petroleum gas or natural gas, in response to outside air conditions, primarily temperature.

Kimball, Pat. No. 2,023,892, discloses mechanical means for retarding spark advance dependent upon engine RPM and carburetor throttle-valve opening.

SUMMARY OF THE INVENTION

It is a particular object of the present invention to improve the operation of an internal combustion engine so that it may operate continuously with minimum knocking on low knock-rated fuels over a complete range of speed and load conditions on the engine. By not only directly detecting knock condition in a combustion chamber of the engine and generating a control signal in response to such knock condition, but simultaneously regulating both the rate and quantity of anti-knock fluid supplied in response to a detected load condition on the engine, all conditions responsible for knock are efficiently and effectively controlled over all load and speed conditions. In accordance with a preferred form of apparatus for carrying out this invention, operating load conditions on the engine are determined by engine RPM and manifold vacuum, as a measure of mass flow rate of air supplied by a conventional intake-manifold arrangement. Alternatively, the measured load condition may be detected by directly measuring velocity, pressure and temperature of air flow, (with or without vaporized fuel) through the engine air induction system. Then, during and only during the time that knock is occurring in the engine an injection system is arranged to inject precise volumes of anti-knock fluid in an amount and to an extent continually responsive to the operating load conditions. Such an arrangement permits a relatively small amount of carefully metered anti-knock fluid to be added directly to the fuel system so that fully satisfactory operation is obtained while operating the engine on a low knock-rated fuel as the principal and primary energy source.

Further objects and advantages of the present invention will become apparent from the following detailed description of the preferred embodiments.

BRIEF DESCRIPTION OF THE DRAWINGS

FIG. 2 is a block diagram illustrating the necessary operating elements shown in the engine system of FIG. 1.

FIG. 3 is a circuit diagram of the injection control system shown in FIGS. 1 and 2.

DESCRIPTION OF THE PREFERRED EMBODIMENT

Figure 1:
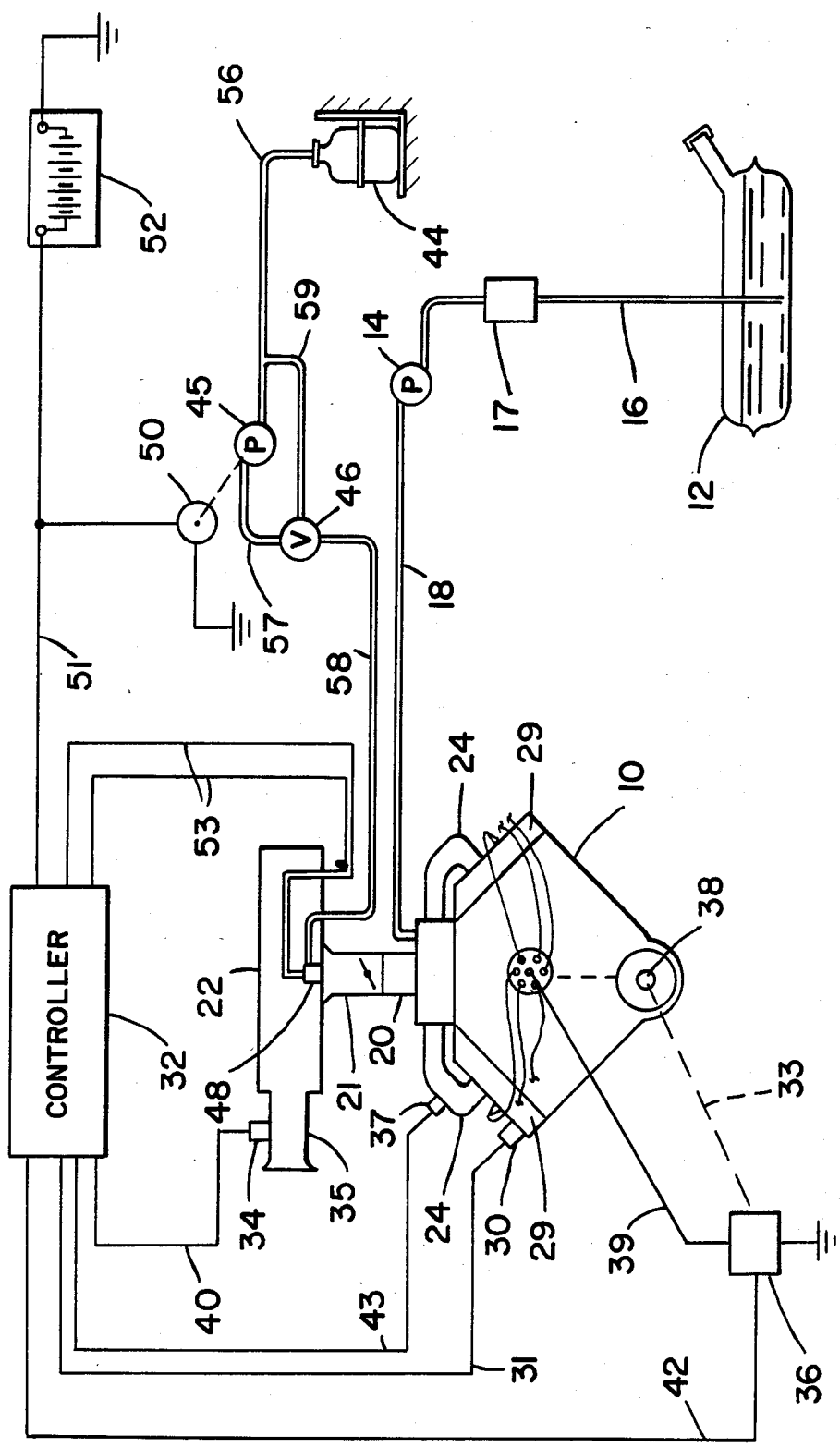
FIG. 1 is a schematic representation of the present invention as applied to an internal combustion engine system which includes a knock sensor, an air massflow sensor, and an anti-knock fluid injection system comprising an auxiliary anti-knock fluid reservoir, pump and time control mechanism for injecting anti-knock additive into the engine intake system, in an amount and to an extent required to suppress knock while the engine is operating on low knock-rated fuel.

Referring now to FIG. 1, the present invention is shown as applied to a spark-ignition automobile engine 10 having a conventional fuel system including intake manifold 24. To operate such an engine over complete ranges of climate, speed and load on a low knock-rated fuel from tank 12, the present embodiment of the invention provides means for injecting precise quantities of anti-knock fluid in response not only to detected knock conditions but also to engine load conditions. As indicated, fuel from tank 12 is pumped by pump 14, through supply line 16, fuel filter 17 and line 18 to carburetor 21. Carburetor 21 mixes fuel from line 18 with air taken in through air cleaner 22. The resulting fuel-air mixture is introduced into intake manifold 24, feeding both banks of a V-engine. Alternatively, of course, the engine fuel-air system can be replaced by separate air intake and fuel injection systems wherein fuel intake supply line 18 is metered by suitable equipment to the individual combustion chambers (not shown), or line 18 injects fuel into throttle body 20 (without need of carburetor 21).

In the present system, fuel from tank 12 is preferably of a low knock-rated type, (sometimes referred to as "low octane") and preferably is as low as may be compatible with engine construction and normal operating conditions of engine 10, that is, during 80–90% of engine operating conditions. It is expected and anticipated that the engine will develop knock under certain load conditions imposed (either alone or in combinations), by acceleration rate, temperature, speed, spark advance, road grade and other operating variables. When knock occurs, it is detected by knock detector 30 mounted directly on the engine cylinder head 29, inlet manifold 24 or adjacent to one of the combustion chambers of engine 10. Preferably a single detector is used on a cylinder of a multicylinder engine that is most likely to knock. Obviously, additional knock detectors can be used. Knock detector 30 may be of the magnetostrictive type disclosed in U.S. Pat. No. 2,445,318, issued July 20, 1948. Alternatively, detector 30 may be of the piezoelectric type. (For example, see U.S. Pat. No. 4,225,802, issued Sept. 30, 1980.) Such knock detectors generate an electromagnetic signal in response to mechanical vibrations produced by engine knock.

Knock and other noises of the engine, such as valve clatter, piston slap, connecting rod or crank-shaft bearings and other mechanical vibrations of the engine, can be readily distinguished by frequency components of the electrical signal so generated. In general, it is known that acoustic frequencies between 4,000 and 9,000 hertz are typical of actual knock conditions under varying engine speeds and loads. A suitable filter and knock signal detection system is included in knock controller or processor 32 which is shown and described below in conjunction with FIG. 3.

In accordance with this invention, knock controller 32 is simultaneously supplied with a signal representative of operating load conditions on engine 10. In the present embodiment, two such signals representative of these conditions are shown. One is indicated as mass flow detector 34 mounted directly on inlet 35 of air cleaner 22.

The primary detector elements for mass flow detector 34 include (1) an air velocity sensor operating by vortex shedding, vortex generation frequency, or heated resistance wire, (2) an air temperature sensor, such as a thermocouple, and (3) a pressure sensor, such as a capacitance microphone. Basically, each of these elements measures a quantity required to compute the molecular mass of air flowing to the individual cylinders through intake manifold 24. The signal from detector 34 is fed to controller 32 by line 40. Alternatively, engine load may be well approximated by engine speed (detected by engine tachometer 36) and manifold pressure (detected by transducer 37). As indicated, the signals from tachometer 36 and transducer 37 are connected to controller 32 by lines 42 and 43, respectively.

Drive of tachometer 36 may be mechanical, as indicated by dashed line 33 to engine pulley 38, or electrical, as by line 39.

In the present embodiment, knock controller 32 is arranged primarily to determine when operating conditions in engine 10 may require the addition of anti-knock fluid from an auxiliary source, such as reservoir 44 through injector 48 into carburetor 21 feeding the engine cylinders. Reservoir 44 is preferably a one- or two-quart container or bottle of alcohol, water, higher octane rated gasoline or other liquids. Such fluid is supplied to injector 48 by line 58 through pump 45, pressure regulator 46 and interconnected piping including lines 56, 57 and 59. Pump 45 may be engine driven (by gear or pulley and belt, not shown) or driven by a small DC motor or actuator 50 connected to starter-ignition battery 52. Control valve 46 modulates the pressure of anti-knock additive supplied to injector 48. Injector 48, as shown, may be of the electronic fuel injector type, wherein liquid is continuously flowing through a closed loop comprising supply line 56 and 57 and return line 59. Injector 48 operates in accordance with the "demand" signal supplied by knock controller 32. By slightly varying the pressure in line 58 by adjustment of valve 46, more or less additive is supplied by injector 48 to the air stream into carburetor 21, or recirculated.

As indicated, bottle 44 desirably has a capacity of only about one pint to two quarts so that it can be readily accommodated in the engine compartment of an automobile or truck. It is easily replaceable from time to time, say, with each refueling of tank 12 with 10 to 20 gallons of low knock-rated fuel. As discussed above, where small but effective amounts of anti-knock are added at such times as the engine is actually knocking, precise control of such amounts are supplied as successive pulses or spurts of anti-knock fluid, each pulse being controllable as to rate and duration to match the "octane" requirement that will precisely correspond to engine load conditions. Accordingly, one quart of a combination of alcohol and water to each twenty gallons of fuel will be a normal rate of consumption of such anti-knock fluid when the fuel from tank 12 is of a lower rated knock value than those now generally available as gasoline.

FIG. 2 shows in a block diagram the essential operating functions of knock controller 32 in the system of FIG. 1. FIG. 3 shows in greater detail an operating embodiment of controller 32. As indicated in both FIGS. 2 and 3, an engine load processor module 60 operates in response to a detected engine load condition signal, such as that generated in response to engine RPM and manifold pressure detected respectively by crank-shaft tachometer 36 and pressure transducer 37 or mass flow detector 34 measuring air flow into air cleaner 22. Either of these detector systems continuously monitors engine operating load condition. Mass flow detection is particularly desirable because it is a direct function of load on engine 10.

While the combination of engine tachometer 36 and manifold (absolute) pressure sensor 37 is a relatively accurate measure of engine load, this combination does not directly measure engine load. A more precise measure of load is the actual quantity of air flowing in the intake manifold. However, since engines are most knock-prone at high manifold pressures, air mass flow under potential knock conditions may be easily measured by tailoring the control system to respond to predetermined manifold pressure and RPM ranges.

In the present arrangement, controller 32 also includes a circuit 62 designated in FIG. 2 as Anticipated Load Range Control which, as indicated by the name, provides anticipatory control over the complete load range imposed on engine 10 where it is essential to inject anti-knock fluid into the intake manifold to obtain satisfactory engine performance. As indicated in more detail in FIG. 3, control 62 includes three stages of amplification represented by amplifiers 71, 73, and 74. Amplifier 72 controls the threshold for input signal voltage supplied by divider circuit 75 represented by resistors 76 and 77. Potentiometer 78 sets the threshold level at which the balance of the circuit represented by amplifier 73, 74 will respond to set the duration parameter on knock and load processor 68. Variable resistor 80 between amplifier stages 73 and 74 sets the rate of change of voltage responsive to load measured in engine load processor 60 to control the input voltage to amplifier 74 which, in turn, determines the values of the load control parameters to which processor 68 will respond.

An Injector Dwell Adjustment, designated as circuit 70, includes voltage regulator 85 and potentiometer 86 that limits maximum "dwell" time for actuation of injector 48 in response to each pulse generated in processor 68 due to both knock and engine load conditions.

While not disclosed in detail, signals from knock detector 30 are indicated as being processed through Knock Filter 64 and Knock Trigger 66. Both of these units may be incorporated in processor 68, but for sake of clarity and understanding they are shown in FIGS. 2 and 3 as separate circuits. Details of such circuits are not shown, but are well known in the art. In general, filtered signals with frequencies of from 4,000 to 9,000 hertz are measured for threshold intensity to actuate a gate or relay to indicate the presence of knock or ring in the engine. In operation, the function of knock filter 64 is to discriminate between actual knock in the engine and other noises associated with operation of the engines such as piston slap, bearing noises, and normal combustion sounds. Such a circuit responds only to frequency components of engine knock to activate Knock Trigger 66, which in turn, activates the process controller 68 to power Injector Power Control 72. As indicated in FIG. 3, this circuit includes a pair of transistors 92 and 93 for supplying DC pulses to coil 94 of injector 48 to actuate solenoid valve 95 against spring 96.

The invention as particularly embodied in the circuit of FIG. 3 has particular advantage in injecting anti-knock fluid directly into the engine air stream. It lies in the fact that anti-knock fluid is delivered only when (1) engine load condition presets the system to inject a small but effective pulse or "shot" of anti-knock fluid into the fluid system, and (2) knock in fact occurs. Further, it supplies precise amounts of anti-knock fluid only for so long as both conditions are present. In the present embodiment each pulse or shot of anti-knock fluid is delivered so that it has the same known flow rate, but in response to controller 32 these pulses are supplied at a frequency (number per unit time) which is varied directly in response to knock. Alternatively, of course, the delivered volume (time × rate) of each fluid pulse is delivered in response to load.

Circuit components of an operating embodiment of knock controller 32 are as shown on FIG. 3.

Various modifications and changes in the method and apparatus embodiments of the present invention will occur to those skilled in the art. Such modifications or changes coming within the scope of the appended claims are intended to be included therein.

What is claimed is:

1. The method of operating an internal combustion engine on a low knock-rated fuel as the primary fuel system for said engine with minimum knocking under load conditions which comprises:

detecting a knock condition in a combustion chamber of said engine, generating a knock signal in response to said knock condition, simultaneously detecting load condition on said engine inducing such knock condition, and generating another signal in response to said load condition, supplying an anti-knock fluid to said engine in response to simultaneous detection of both said knock signal and said load condition signal, and selectively varying the amount and the extent of said supply of said anti-knock fluid in response to said load condition such that said supply is only sufficient to maintain said knock signal below a predetermined level during operation of said engine under said load condition.

2. The method of optimizing the addition of a knock suppressing fluid to a normally, low knock-rated fuel for operating an internal combustion engine with minimum knock which comprises:

continuously measuring load conditions on said engine over a range of loads normally causing an engine to knock, detecting a knock condition in said engine, and responsive to the simultaneous presence of knock and an engine load condition within said range injecting an anti-knock fluid into the intake system of said engine in an amount and to an extent dependent upon said engine load condition and only sufficient to suppress said knock below a predetermined level of said detected knock condition.

3. The method of suppressing knock while operating an internal combustion engine under a knock inducing load condition on a primary fuel having a low knock rating which comprises:

continuously detecting load conditions imposed on said engine, measuring the value of the load condition thereby detected, detecting knock in at least one cylinder of said engine, measuring the intensity and duration of the detected knock, responsive to a predetermined measured value of said load condition and only when said measured knock exceeds a predetermined value injecting into said engine a knock suppressing fluid in an amount dependent upon the value of the load condition which amount is sufficient to maintain said measured value of knock below said predetermined value.

4. The method of controlling the periodic addition of small but effective amounts of a knock suppressing fluid to the fuel intake system of an internal combustion engine being operated on a primary fuel having a low knock rating which comprises:

determining a condition representative of the operating load on said engine to anticipate potential knock thereof when operated on said primary fuel, simultaneously detecting any actual knock condition induced by said operating load, and responsive to the presence of both of said conditions injecting an amount of knock suppressing fluid into said fuel intake system of said engine, said knock suppressing fluid being injected at a rate and in an amount dependent upon said operating load and sufficient only to suppress knock of said engine under said load condition.

5. The method of operating an internal combustion engine on a low knock-rated fuel with suppressed knock under high knock inducing conditions which comprises:

continuously measuring load conditions on said engine over at least the range of loads that would normally cause an engine to knock, detecting the occurrence of any knock condition of predetermined magnitude in said engine, and responsive to the simultaneous presence of said knock condition and said measured engine load condition being within said load range injecting an anti-knock fluid with the low knock-rated fuel and air mixture supplied to said engine, the amount and the extent of such injection being determined by said detected load condition and being sufficient only to suppress said knock condition.

* * * * *